F. RAYMOND.
MACHINE FOR GROOVING JOURNAL BEARINGS.
APPLICATION FILED APR. 20, 1907.

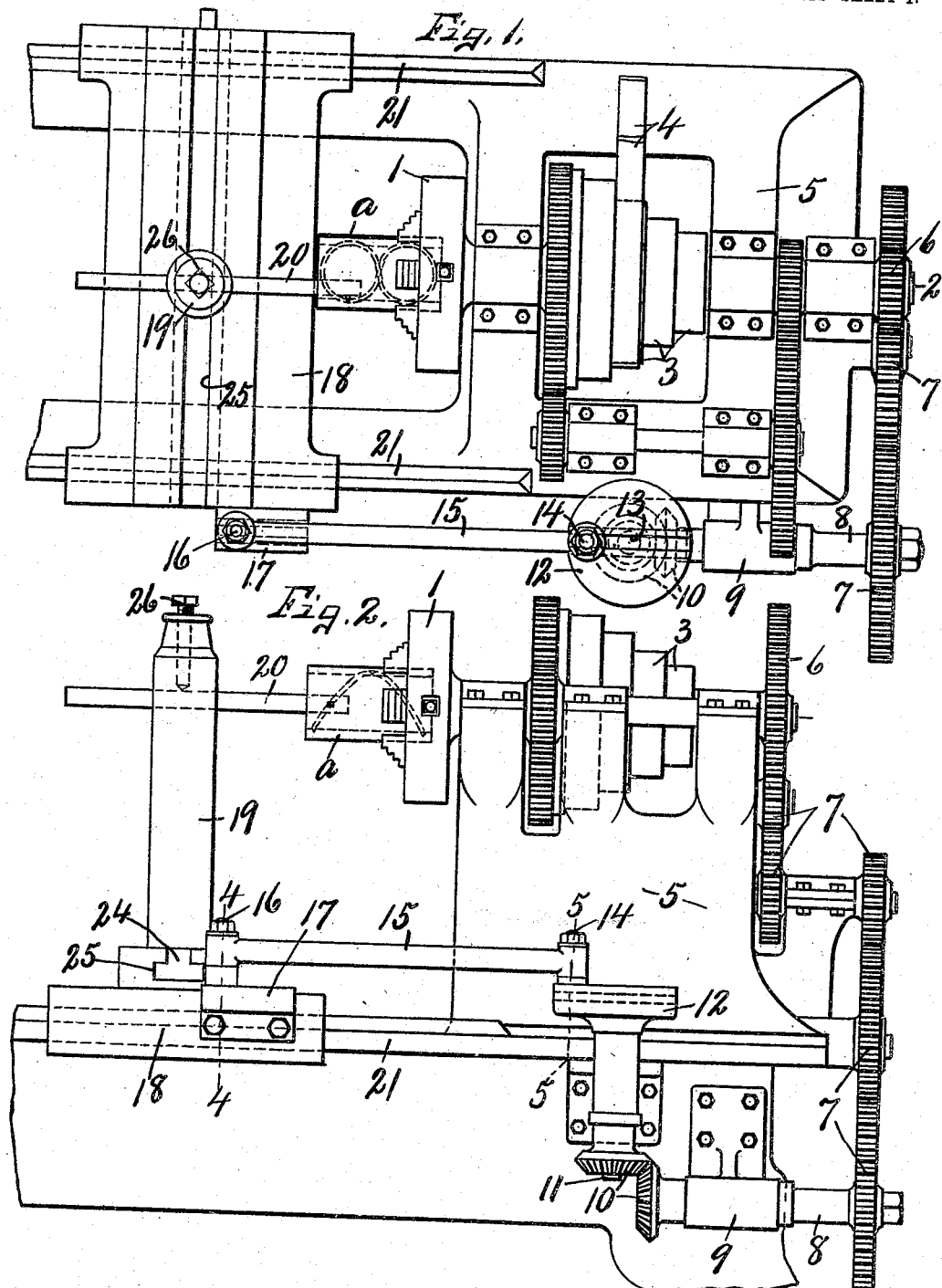

930,988.

Patented Aug. 10, 1909.
2 SHEETS—SHEET 2.

WITNESSES
Chas. H. Hughes.
H. E. Chase

INVENTOR
F. Raymond
BY
Howard Denison
ATTORNEY

UNITED STATES PATENT OFFICE.

FRANK RAYMOND, OF SYRACUSE, NEW YORK, ASSIGNOR TO CHRISTOPHER C. BRADLEY, SR., OF SYRACUSE, NEW YORK.

MACHINE FOR GROOVING JOURNAL-BEARINGS.

No. 930,988.          Specification of Letters Patent.          Patented Aug. 10, 1909.

Application filed April 20, 1907. Serial No. 369,348.

*To all whom it may concern:*

Be it known that I, FRANK RAYMOND, of Syracuse, in the county of Onondaga, in the State of New York, have invented new and useful Improvements in Machines for Grooving Journal-Bearings, of which the following, taken in connection with the accompanying drawings, is a full, clear, and exact description.

This invention relates to certain improvements in machines for grooving journal bearings and other cylindrical surfaces, and is especially useful in cutting return spiral channels in or upon cylindrical bearings for retaining a limited reserve of oil and distributing the same uniformly over the entire bearing surface.

The generic object is to provide a simple, practical and automatic mechanism adapted to be applied or attached to any lathe or similar machine for cutting return channels of different lengths in any cylindrical surface or bearing. In other words, it is sought to associate with any rotary clutch and its actuating mechanism an attachment synchronized with the movement of such chuck for automatically cutting a return spiral groove.

Other objects and uses relating to the specific parts of the invention will be brought out in the following description.

Figure 3:
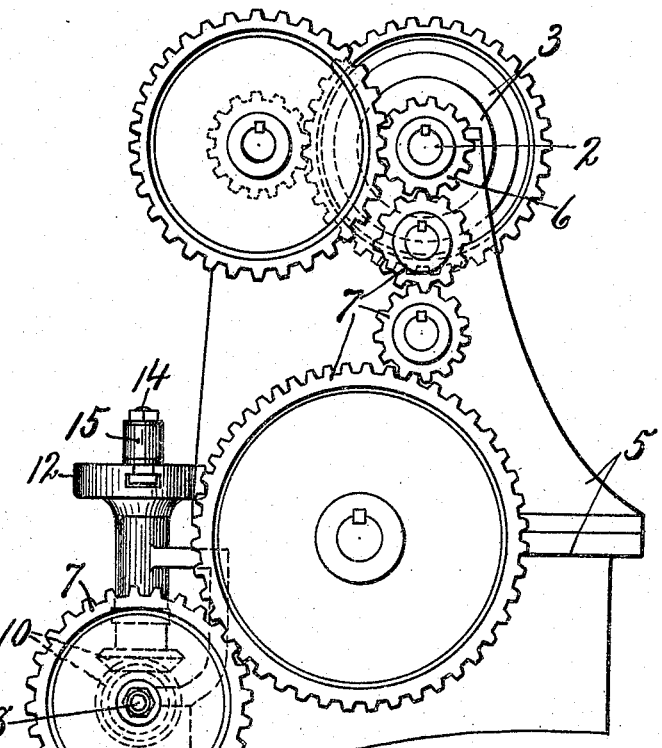
Figure 4:
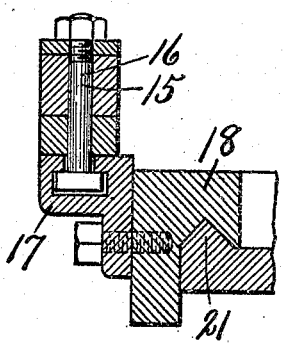
Figure 6:
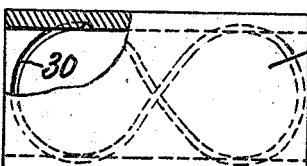
Figure 5:
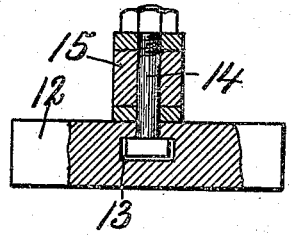
Figure 7:
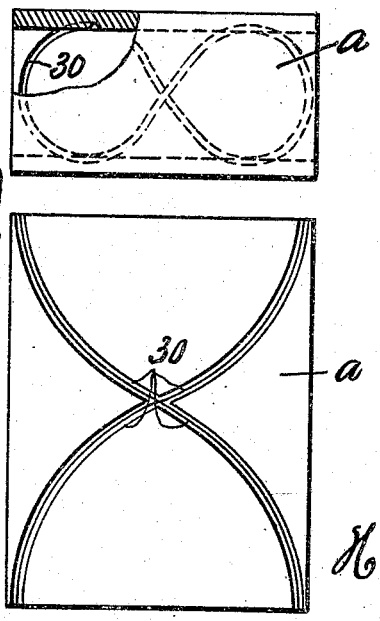

In the drawings—Figures 1 and 2 are respectively top plan and side elevation of a portion of a lathe with my improved grooving attachment associated therewith. Fig. 3 is an end view of the parts seen in Figs. 1 and 2. Figs. 4 and 5 are enlarged sectional views taken respectively on lines 4—4, and 5—5, Fig. 2. Fig. 6 is a top plan, partly in section, of a sleeve or bearing having a return spiral oil channel cut with the mechanism shown in Figs. 1, 2 and 3. Fig. 7 is a development of the grooved bearing seen in Fig. 6.

In carrying out the objects stated, I make use of an ordinary lathe having a rotary chuck or face plate —1— which is mounted upon a driving shaft —2— having suitable cone pulleys —3— adapted to be connected by a driving belt —4— to any available source of power not necessary to herein illustrate or describe. This shaft —2— is journaled upon a suitable supporting frame —5— and is provided with a gear —6— from which motion is transmitted by suitable gearing —7— to an auxiliary shaft —8—. This latter shaft is, therefore synchronized in its rotation with the driving shaft —2— and is, in this instance, journaled in suitable bearings —9— on the main frame —5— parallel with the shaft —2— and serves as a means for transmitting rotary motion through the medium of gears —10— to an upright shaft —11— and rotary disk 12— rigid thereon.
This disk —12— is provided with a diametric tee-slot 13— carrying a stud or spindle 14— having a tee-head fitted in and adjustable lengthwise of the slot to which is connected one end of a connecting rod or link 15—.
The opposite end of this connecting rod is pivotally connected to a stud —16— which is adjustably mounted in a slotted bracket —17— of a sliding cross-head 18. A toolpost 19— is adjustably mounted in the usual manner upon the cross-head —18— and carries a suitable groove-cutting tool —20—.

The cross-head 18— is movable back and forth upon suitable ways —21— upon the main frame —1—, and it is therefore evident that the reciprocatory movement of the cross-head —18— and tool —20— carried thereby is also synchronized with the rotation of the chuck —1— by reason of the fact that it derives its motion from the same shaft —2— which carries the chuck. It is also evident that securing a bearing, as a sleeve —a— or other cylindrical article to be grooved in the chuck —1— the combined rotary action of the sleeve or bearing, together with the reciprocatory action of the tool or cutter —20— will produce a spiral groove or channel in said bearing, and although I have shown the cutter as applied to the inner surface of the sleeve, the device is equally applicable for cutting grooves in the exterior of this, or other cylindrical surfaces.

The object in providing for the adjustment of the pivotal connection between the rod 15— and disk 12— radially of said disk is to vary the reciprocatory movement of the cross-head —18—, thereby permitting a variation in the extreme length of the spiral groove which it may be desired to cut in the bearing —a—, and the similar adjustment of the opposite end of the cutting rod with the cross-head, or rather with the bracket —17— thereon permits the cutting edge of the teeth to be positioned at any point where it may be desired to begin the cut in the sleeve or bearing —a—.

The tool-post —19— and tool —20— thereon are adjustable transversely of the rotary chuck —1— so as to feed the cutting edge of the tool into engagement with the article as —a— to be channeled and for this purpose the base of the tool holder is provided with a tee head —24— slidably mounted in a transverse slot —25— in the cross head —18—, the tool being held in its adjusted position on the post by a set screw —26— or equivalent holding means. The invention, however, consists essentially of a rotary holding device for the article to be channeled in combination with a sliding cross head carrying the cutting tool and movable axially of the rotary chuck with actuating means therefor including an adjustable connection for varying the throw or degree of axial movement of the cross head whereby a continuous spiral groove of any extreme length from one return to the other may be cut either in the interior or exterior of said article.

In operation the article as the bearing —a— to be grooved or channeled is clamped at one end in the chuck —1— to the tool holder and then adjusted to bring the cutting end of the tool into engagement with the bearing —a— at the point where it is desired to bring the cut which may be effected by adjusting the tool —20— in the tool holder —19— or its stud —16— in the slotted bracket —17— whereupon the stud —14— is adjusted on the rotary disk —12— to give the desired throw or axial movement of the cutter —20— from one extreme or point of return on the bearing to the other after which the stud —14— is rigidly clamped to the head of the disk —20—, the whole device being set in motion through the medium of the belt —4— and its driving mechanism, not shown.

The gears —7— for transmitting rotary motion from the chuck shaft —2— to the auxiliary shaft —8— are in this instance so proportioned as to drive the auxiliary shaft —8— at one-half the speed of the shaft —2— so that by making the gears —10— of equal pitch the disk —11— will be rotated one-half revolution thereby carrying the cutting tool —20— from one extreme end to the opposite end of the bearing during one complete revolution of said bearing to cut one-half of the spiral groove as —30— while the return half revolution of the disk —11— returns the cutter the same distance but in reverse direction to the point of starting to cut a similar but reverse spiral groove which, however, is continuous with the first half of the groove thereby producing a continuous return spiral groove, portions of which intersect each other in one side of the longitudinal center of the bearing, such groove presenting, when viewed from one side, the form of a figure 8.

It is evident that by varying the relative sides of the gears, which transmit motion from the shaft —2— to the auxiliary shaft —8—, the groove may be made to intersect itself at more than one point, if desired.

What I claim is:

1. In a machine for forming continuous return spiral grooves in journal bearings, a rotary shaft, a chuck secured to the shaft for supporting and rotating a journal bearing, a rotary disk, means for transmitting motion from the shaft to the disk, a cross head movable lengthwise of the axis of the shaft, a rigid connecting rod having one end pivoted to the disk at one side of the axis thereof and its other end pivoted to the cross head, and a tool post mounted on the cross head and provided with a cutting tool projected therefrom toward the chuck a distance equal to or greater than the distance between the axis of the disk and pivotal connection between said disk and connecting rod.

2. In a machine for forming continuous return spiral grooves in journal bearings, a lathe comprising a main supporting frame, a rotary chuck for supporting a journal bearing, a driving shaft for the chuck, a rotary disk at the front side of the frame and provided with a diametric slot, a stud lengthwise of said slot, means for clamping the stud in its adjusted position, a cross head movable lengthwise of the frame toward and from the chuck and provided on its front side with a lengthwise slot, a stud adjustable lengthwise in the slot and in the cross head, means for clamping the last named stud in its adjusted position, a rigid connecting rod having one end journaled on the stud on the disk and its other end journaled on the stud on the cross head, and a tool post mounted on the cross head and provided with a tool projecting therefrom toward the chuck a distance equal to or greater than the distance between the axis of the disk and center of the stud mounted thereon.

In witness whereof I have hereunto set my hand this 10th day of April, 1907.

FRANK RAYMOND.

Witnesses:
H. E. CHASE,
M. M. NOTT.